(12) United States Patent
Sullivan et al.

(10) Patent No.: US 9,227,278 B2
(45) Date of Patent: *Jan. 5, 2016

(54) BOLT HOLE REPAIR TECHNIQUE

(75) Inventors: Nicole Sullivan, Manchester, CT (US); David A. Rutz, Glastonbury, CT (US); Monika D. Kinstler, Glastonbury, CT (US); James J. Moor, New Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 2208 days.

This patent is subject to a terminal disclaimer.

(21) Appl. No.: 12/080,701

(22) Filed: Apr. 4, 2008

(65) Prior Publication Data

US 2009/0250441 A1 Oct. 8, 2009

(51) Int. Cl.
   *B23K 1/00* (2006.01)
   *B23P 6/00* (2006.01)
   *B23P 6/04* (2006.01)

(52) U.S. Cl.
   CPC  *B23P 6/007* (2013.01); *B23P 6/045* (2013.01)

(58) Field of Classification Search
   CPC ............................. B23K 9/04; B23K 1/0004
   USPC ............. 219/76.14, 85.14, 117.1, 119, 85.15; 228/244, 245, 246
   See application file for complete search history.

(56) References Cited

U.S. PATENT DOCUMENTS

| | | | |
|---|---|---|---|
| 2,120,525 A | 6/1938 | McKerihan | |
| 3,066,400 A * | 12/1962 | Forsythe | 29/402.17 |
| 3,246,392 A | 4/1966 | Altgelt | |
| 3,576,065 A * | 4/1971 | Frazier | 29/402.18 |
| 3,740,820 A | 6/1973 | Tarves, Jr. | |
| 4,953,777 A | 9/1990 | Griffith et al. | |
| 5,111,570 A | 5/1992 | Baumgarten et al. | |
| 5,201,455 A | 4/1993 | Reynolds, Jr. et al. | |
| 5,606,797 A | 3/1997 | Reynolds | |
| 6,281,467 B1 | 8/2001 | Gould et al. | |
| 6,490,791 B1 | 12/2002 | Surace et al. | |
| 6,545,244 B1 | 4/2003 | Gould et al. | |
| 6,742,698 B2 | 6/2004 | Shah et al. | |
| 7,141,754 B2 | 11/2006 | Workman et al. | |
| 7,146,725 B2 * | 12/2006 | Kottilingam et al. | 29/889.1 |
| 7,552,855 B2 * | 6/2009 | Vargas et al. | 228/119 |
| 2005/0015980 A1 * | 1/2005 | Kottilingam et al. | 29/888.011 |
| 2005/0061858 A1 | 3/2005 | Ditzel et al. | |
| 2005/0173493 A1 * | 8/2005 | Workman et al. | 228/101 |
| 2007/0084906 A1 * | 4/2007 | Vargas et al. | 228/119 |

FOREIGN PATENT DOCUMENTS

| | | |
|---|---|---|
| EP | 1 775 061 | 4/2007 |
| SU | 548400 | 2/1977 |

OTHER PUBLICATIONS

European Search Report—EP 09 25 0882—Dated Jul. 21, 2009—8 Pages.

* cited by examiner

*Primary Examiner* — Dana Ross
*Assistant Examiner* — Ayub Maye
(74) *Attorney, Agent, or Firm* — Kinney & Lange, P.A.

(57) ABSTRACT

A method of hole defect repair includes removing one or more defects at or near a desired hole in a part by removing a portion of the part proximate the desired hole in a series of chain link patterns, and welding a filler material to the part after removing the chain link pattern portion of the part.

15 Claims, 6 Drawing Sheets

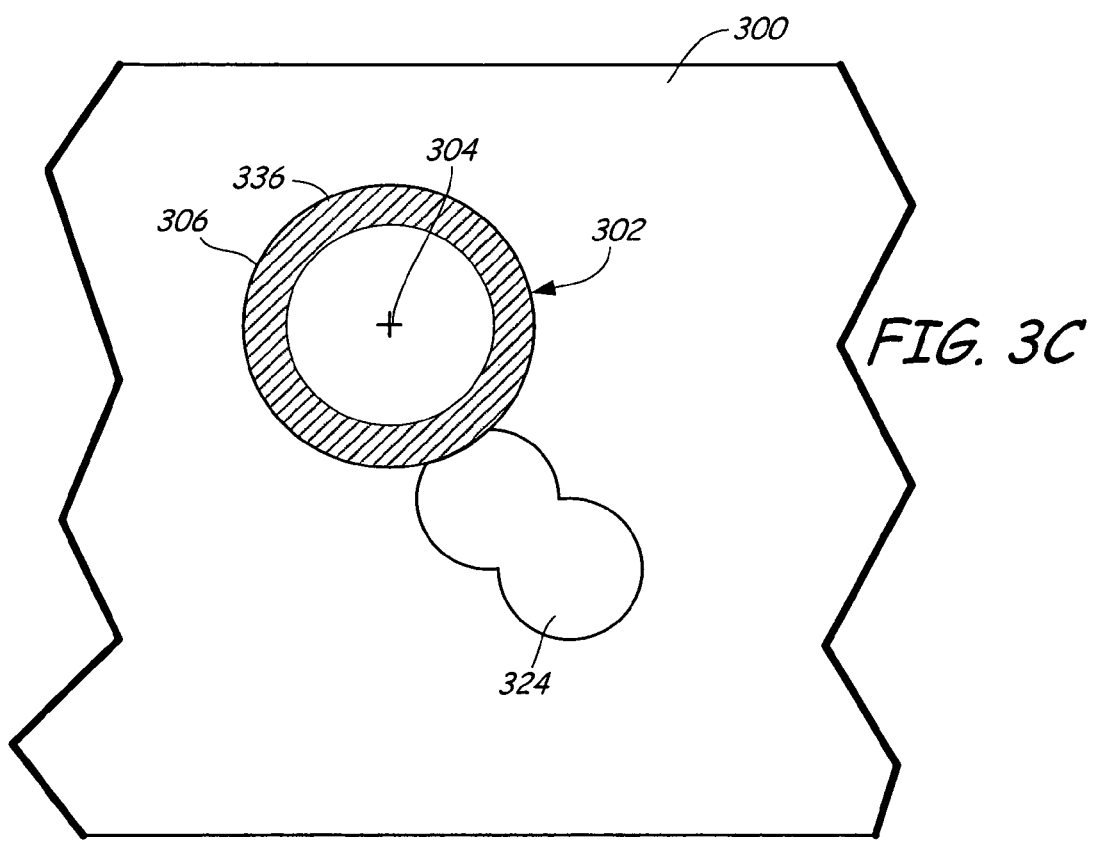

BOLT HOLE REPAIR TECHNIQUE

CROSS-REFERENCE TO RELATED APPLICATION(S)

Reference is hereby made to the following copending application: HOLE REPAIR TECHNIQUE AND APPARATUS, Vargas et al., application Ser. No. 11/249,668 filed on Oct. 13, 2005.

BACKGROUND

The present invention relates to methods of repairing base materials, and more particularly to methods of repairing damaged base materials having holes disposed therethrough.

It is possible to repair worn, corroded, or otherwise damaged holes in metallic base materials. However, known repair techniques cause excessive removal of parent material. For instance, in order to repair a crack that has formed at a perimeter of a rivet hole in a flange made of AA6061 aluminum (Al), the hole is remachined to a larger diameter to remove the crack. In other words, a circular hole would be remachined co-axially with the centerline axis of the existing (and damaged) rivet or bolt hole and to a diameter larger than the desired (i.e., blueprint) rivet hole diameter. A bushing is then press-fit or adhesively bonded to the flange inside the remachined hole to produce a repaired hole at the desired blueprint specifications, for parameters such as size and shape. However, this type of repair is not a structural repair, and the load-carrying capabilities of the repaired structure are less than ideal. Also, because of the parent flange material removal, there is a finite number of times the repair can be performed. Hole walls may also be repaired by various fusion welding processes, however, the processes often lead to unacceptable weld defects. Therefore, there is a need for improved methods of repairing damaged holes in metallic parent materials.

SUMMARY

The present invention provides methods for repairing damage to a part with a hole. In one embodiment, the present invention includes removing at least defects at or adjacent a desired hole in a part by removing a first portion of the part proximate the desired hole. A second portion of the base material proximate to the first portion is removed, wherein the first and second portions create a chain of overlapping apertures adjacent to the desired hole. A filler material is welded to the part after removing the first and second portions of the base materials.

In alternate embodiments, the present invention provides methods of hole defect repair wherein a substantially circular first opening is created in the part that is larger in diameter than the desired hole, and the centerline axes of the desired hole and the first opening are aligned. A second opening in the part is created proximate the perimeter of the first opening, and a third opening is created proximate the second opening. The first, second, and third openings are all contiguous. A filler material is then welded within at least a portion of the first, second, and third openings.

In other embodiments, methods of hole defect repair are disclosed. A discrete defect in a part is identified, and the defect located at or near a substantially circular hole in the part, which has a hole centerline axis. Base material of the part within a region defined by a first circular pattern having a first pattern centerline axis is removed, wherein the first pattern centerline axis is spaced from the hole centerline axis. Base material of the part within a region defined by a second circular pattern having a second pattern centerline axis is also removed, wherein the second pattern centerline axis is spaced from the first pattern centerline axis. A filler is then welded into at least a portion of the region defined by the first circular pattern and second circular pattern.

BRIEF DESCRIPTION OF THE DRAWINGS

FIG. 3C is a schematic plan view of a filler material welded to a part with a hole in a chain link repair pattern, and a hollow insert positioned within the hole.

DETAILED DESCRIPTION

Metal parts having bolt holes, rivet holes, and other similar holes and openings can become worn, corroded, or otherwise oversized or damaged. Damage at or near such holes can include circumferential damage, cracks, corrosion, pitting, elongation, etc. due to localized wear. Such damage can be repaired to return the part, and more specifically the hole formed in the part, back to desired specifications (i.e., returning the hole to blueprint specifications). According to this disclosure, the damage can be removed by first conducting suitable material removal processes, and then welding the part with additional material to provide a hole with desired characteristics (e.g., size, shape and location). In some situations, additional finishing steps, such as additional machining, may be conducted to complete the repair process.

In order to repair a damaged part, the damage is first identified. Known nondestructive inspection (NDI) techniques, such as visual, fluorescent penetrant inspection (FPI), eddy current, ultrasonic and x-ray techniques, etc. can be used. Once the damage has been identified, an appropriate repair procedure can be selected.

Figure 1A:
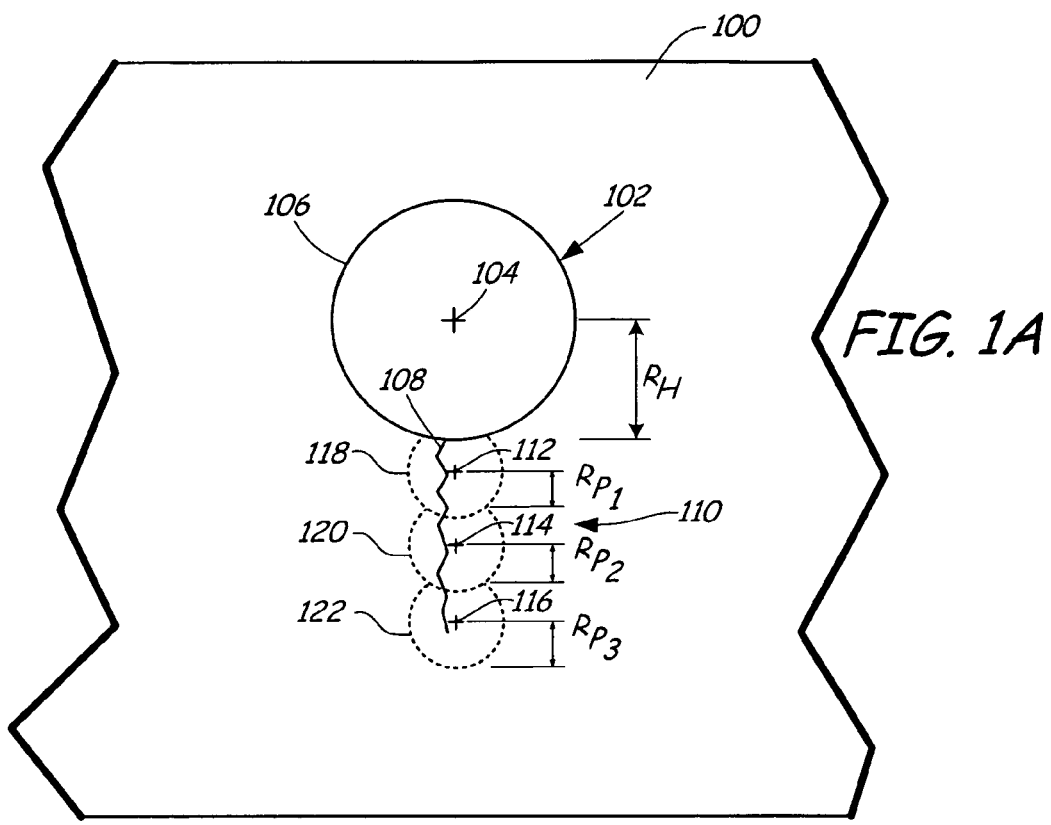
FIG. 1A is a schematic plan view of a repair pattern for a hole in a part with a crack.

"Discrete damage", as referred to herein, means damage to a part at or near a hole where the hole is otherwise substantially dimensionally acceptable. Discrete damage, such as one or more localized cracks located at or near a perimeter of a hole in a base material of the part, can be repaired as follows. FIG. 1A is a schematic representation of part 100 with substantially circular hole 102 therethrough, which is defined by hole centerline axis 104 and hole perimeter 106 at radius $R_H$ about axis 104. Part 100 may be a stator flange of the inner case of a gas turbine engine. Crack 108 in part 100 extends from perimeter 106 of hole 102. Chain-link shaped pattern 110 is established around crack 108.

An outer edge of pattern 110 is defined by pattern centerline axes 112, 114, and 116 and circular pattern perimeters 118, 120, and 122, each which have a respective radius $R_{P1}$, $R_{P2}$, and $R_{P3}$, about axes 112, 114, and 116. First chain link pattern centerline axis 112 is spaced from hole centerline axis 104, and is located outside of hole perimeter 106. Second link pattern centerline 114 is located outside of first link pattern 118, and third link pattern centerline 116 is located outside of second link pattern 120. In the embodiment illustrated, pattern centerline axes 112, 114, and 116 are collinear with hole centerline axis 104. An inner edge of pattern 110 at first chain link perimeter 118 is defined by a portion of hole perimeter 106. Crack 108 is located entirely within pattern 110. Radii $R_{P1}$, $R_{P2}$, and $R_{P3}$ are smaller than radius $R_H$, and are illustrated as being approximately equal, although such a relationship is not required and radii $R_{P1}$, $R_{P2}$ and $R_{P3}$ will vary depending on the size and location of crack 108. Although pattern perimeters 118, 120, and 122 are illustrated as being generally circular, other shapes such as ovals may be utilized as necessary to obtain removal of the entire crack.

Material of part 100 is removed within pattern 110, which removes all of the material of part 100 containing crack 108. Material can be removed by machining (e.g., using a reamer, drill bit, or other tooling), or any other suitable material removal processes used to create apertures in a base material. In practice, pattern 110 can be defined in reference to desired tooling for removing material of part 100, for instance, a desired drill bit. It is generally desired that removal of base material of part 100 (i.e., the parent material) be reduced. In other words, it is desired to leave as much of part 100 intact as is possible, while still removing crack 108 in its entirety. This can be accomplished through selection of parameters such as the location of pattern centerline axes 112, 114, and 116, and the length of radius $R_{P1}$, $R_{P2}$, and $R_{P3}$. In one embodiment, material within first link pattern 118 is removed first and acts as a pilot hole, followed by the removal of second link pattern 120 and third link pattern 122. In alternate embodiments, base material within third link pattern 122 may be removed prior to removal of base material of second link pattern 120 and first link pattern 118. In yet other embodiments, material may be removed from all three chain link patterns 118, 120, and 122 simultaneously.

Figure 1B:
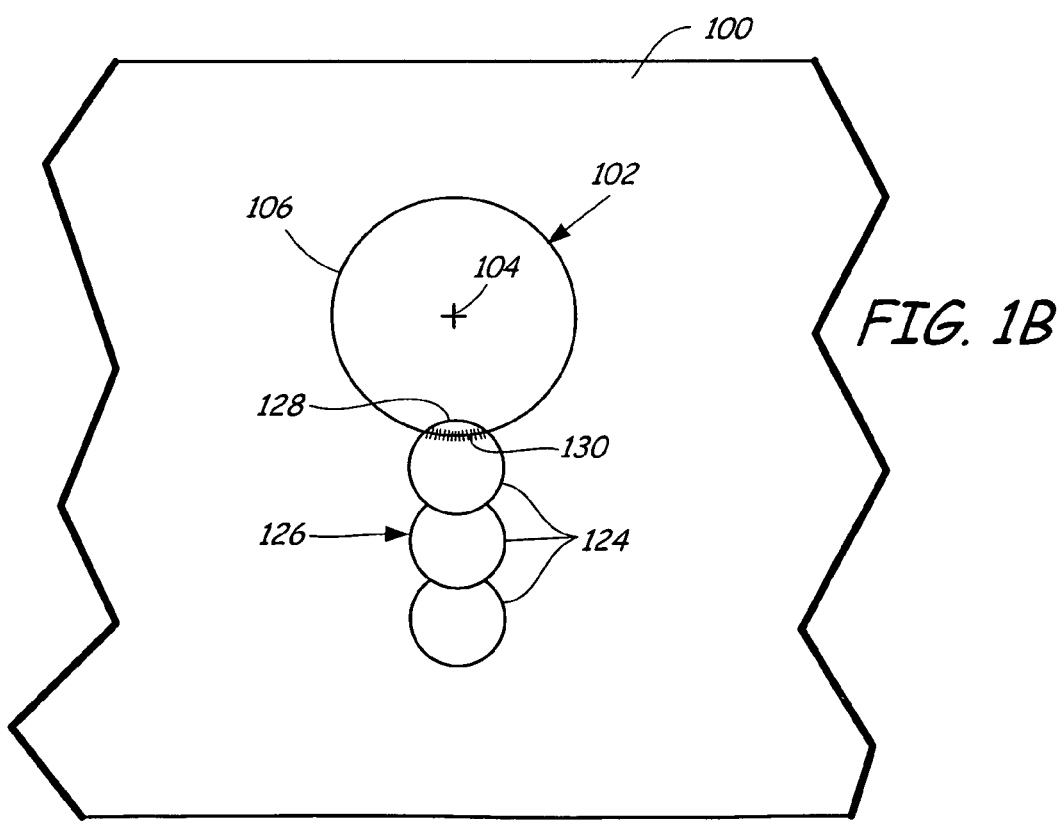
FIG. 1B is a schematic plan view of the part of FIG. 1A after a filler material has been welded to the part.

Referring now to FIGS. 1A & 1B, once base material of part 100 is removed within pattern 110, weld material 124 is welded to part 100 to fill at least a portion 126 of pattern 110. The weld material fills at least a part of the pattern 110 where material of part 100 was removed to at least approximately define hole 102 with desired specifications. With certain base or parent materials for aerospace applications, such as AA6061 aluminum (Al), Inconel® 718 (a high strength austenitic nickel-chromium-iron alloy) and titanium (Ti) 6-4, conductive heat resistance welding can be used. Examples of conductive heat resistance welding processes are found in U.S. Pat. Nos. 6,545,244, 6,281,467, and 7,141,754. In some situations, other welding processes can also be used. Weld material 124 is a weldable material selected according to the desired application, and can be the same material as part 100 or another material. For example, suitable combinations of base material (i.e., the parent material) and weld material (i.e., the filler) are: Inconel® 718 (base material) and Inconel® 718 (filler); Ti-6Al-4V (base material) and commercially pure Ti (filler) or Ti-6Al-4V (filler); Al 6061 (base material) and Al 4043 (filler); Thermospan® alloy (a low-expansion, precipitation hardenable iron-based alloy available from Carpenter Technology Corp., Wyomissing, Pa.) (base material) and Inconel® 625 (filler) or Thermospan® alloy (filler); and Waspaloy (a nickel-base, precipitation hardenable alloy) (base material) and Waspaloy (filler). In addition, the weldable filler materials disclosed in U.S. Pat. No. 6,742,698 and U.S. Pat. App. Pub. No. 2005/0061858 may be suitable weld materials 124 for some applications.

In some embodiments, portion 126 is created by commencing the weld to fill third link pattern 122, followed by filling of second link pattern 120 and first link pattern 118. Starting with third link pattern 122 assures that the beginning of the weld has adequate base material to which the filler material can bond. In alternate embodiments, the weld is started adjacent hole 102, and first chain link pattern 118 is filled prior to the filling of second link pattern 120 and third link pattern 122. This allows for creation of the weld along the perimeter 106 to minimize the amount finishing of the part to complete the repair. It is possible to weld filler 124 within chain link patterns 118, 120, and 122 in separate steps. Machining can be performed between such separate welding steps.

Figure 1C:
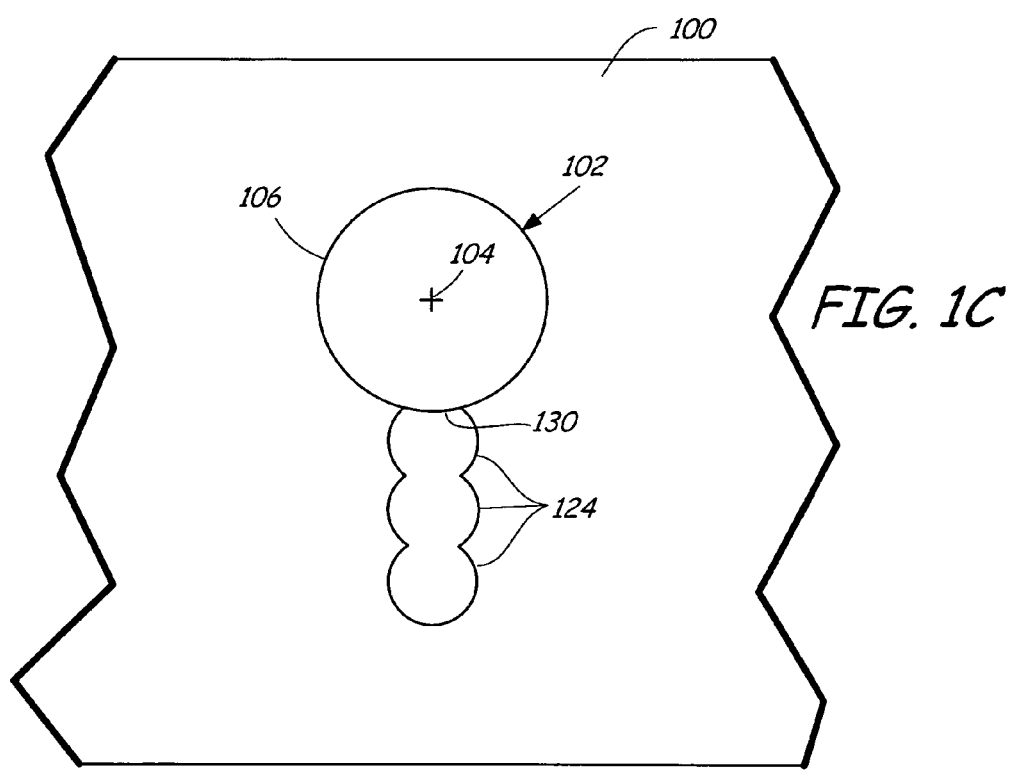
FIG. 1C is a schematic plan view of the part of FIGS. 1A-1B after finishing processes.

In some situations, weld material 124 (i.e., the filler) will not be formed to final specifications and tolerances immediately following the welding process, such as shown in FIG. 1B. In such situations, additional finishing steps can be conducted. For instance, excess weld material 128 may be present within a perimeter of a desired hole location 130. Excess weld material 128 can be removed by machining (e.g., using a reamer, drill bit, or other tooling), or other material removal processes. After finishing, hole 102 substantially matches desired hole location 130, as shown in FIG. 1C.

Figure 2A:
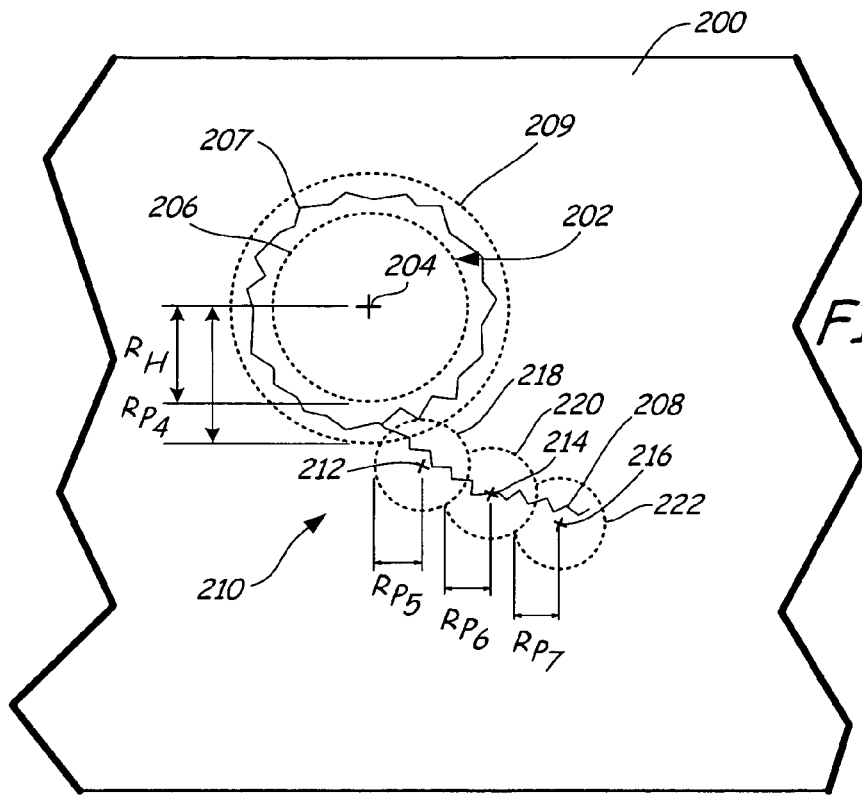
FIG. 2A is a schematic plan view of a complex repair pattern for a hole in a part with circumferential damage and a crack.

In some situations, a metal part may have multiple types of damage. For instance, a part may have non-discrete damage (e.g., corrosion damage over a significant area) as well as discrete damage (e.g., multiple localized cracks) near a hole. A metallic part with multiple types of damage can be repaired according to the present invention using a complex repair pattern made up of a plurality of repair patterns or repair pattern regions. FIG. 2A is a schematic representation of part 200 with desired hole location 202 indicated thereon, which is defined by hole centerline axis 204 and hole perimeter 206 at radius $R_H$ about axis 204. Corroded hole perimeter 207 is located near desired hole location 202. As shown in FIG. 2A, a hole originally formed at desired hole location 202 has circumferential corrosion, which has enlarged the original hole slightly and produced an irregular shaped hole defined by corroded hole perimeter 207. Crack 208 in part 200 extends from corroded hole perimeter 207.

Chain link repair pattern 210 is defined by first pattern perimeter 209 at radius $R_{P4}$ about hole centerline axis 204, which is coaxial with desired hole location 202. Radius $R_{P4}$ is larger than radius $R_H$, such that first pattern 209 encompasses all of corroded hole perimeter 207. Smaller, generally circular, chain link patterns 218, 220, and 222 define the rest of chain link repair pattern 210. Chain link patterns 218, 220, and 222 are each located around a portion of crack 208, starting at first chain link pattern perimeter 218 and ending with third chain link pattern perimeter 222, such that all of crack 208 is located within chain link repair pattern 210. Chain link pattern perimeters 218, 220, and 222, each which have a respective radius $R_{P5}$, $R_{P6}$ and $R_{P7}$, about axes 212, 214, and 216. First chain link pattern centerline axis 212 is spaced from hole centerline axis 204, and is located outside of hole perimeter 206 and first pattern perimeter 209. Second link pattern centerline 214 is located outside of first link pattern 218, and third link pattern centerline 216 is located outside of second link pattern 220.

In the embodiment illustrated, pattern centerline axes 212, 214, and 216 are generally collinear with respect to one another, but not with respect to hole centerline axis 204. Crack 208 is a compound nonlinear crack. An inner edge of first chain link perimeter 218 is defined by a portion of first pattern perimeter 209. Crack 208 and corroded hole perimeter 207 are located entirely within pattern 210. Radii $R_{P5}$, $R_{P6}$, and $R_{P7}$ are smaller than radius $R_H$ (and thus $R_{P4}$), and are illustrated as being approximately equal, although such a relationship is not required and radii $R_{P5}$, $R_{P6}$, and $R_{P7}$ will vary depending on the size and location of crack 208. Similarly, depending on the location and degree of compound crack 208, pattern centerline axes 212, 214, and 216 may have a nonlinear relationship to one another.

Material of part 200 is removed within pattern 210, which first removes material of part 200 in which corroded perimeter 207 is defined. Material of part 200 is then removed within chain link pattern perimeters 218, 220, and 222, which removes material of part 200 containing a portion of crack 208 (i.e., the portion of crack 208 not contained in first pattern perimeter 209). In an alternate embodiment, material may be removed within chain link pattern perimeters 218, 220, and 222 prior to removal of base material of part 200 within first pattern perimeter 209. Material can be removed by machining (e.g., using a reamer, drill bit, or other tooling), cutting, or other material removal processes. In further embodiments, additional patterns can be defined on part 200. The particular number, shape, and arrangement of material removal patterns will vary depending on the particular types of damage to base material of part 200.

Figure 2B:
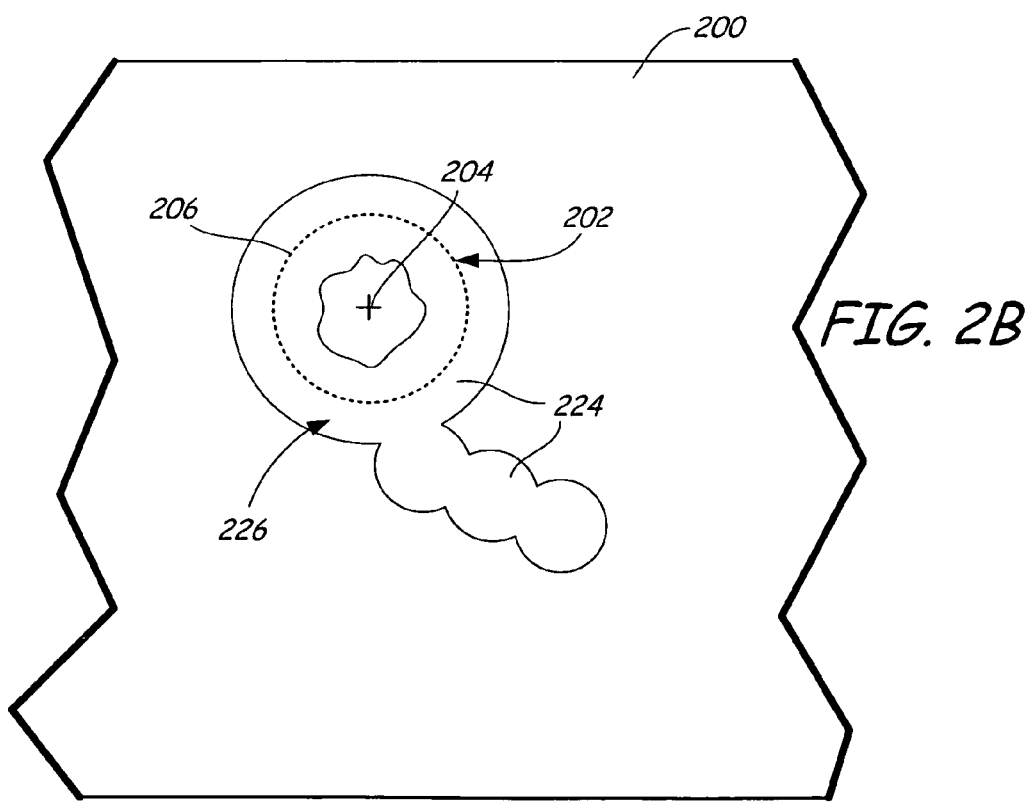
FIG. 2B is a schematic plan view of the part of FIG. 2A after a filler material has been welded to the part.

Once material has been removed from within chain link repair pattern 210, weld material 224 (i.e., the filler) material is welded within at least a portion 226 of repair pattern 210 as shown in FIGS. 2A & 2B. This welding process can be generally similar to that described above with respect to FIGS. 1A-1C. The weld material 224 is generally welded within first pattern 209 and chain link patterns 218, 220, and 222 at the same time. However, it is possible to weld filler 224 within chain link patterns 218, 220, and 222, and then separately weld filler 224 within first pattern 209, or vice versa. Machining can be performed between such separate welding steps.

Figure 2C:
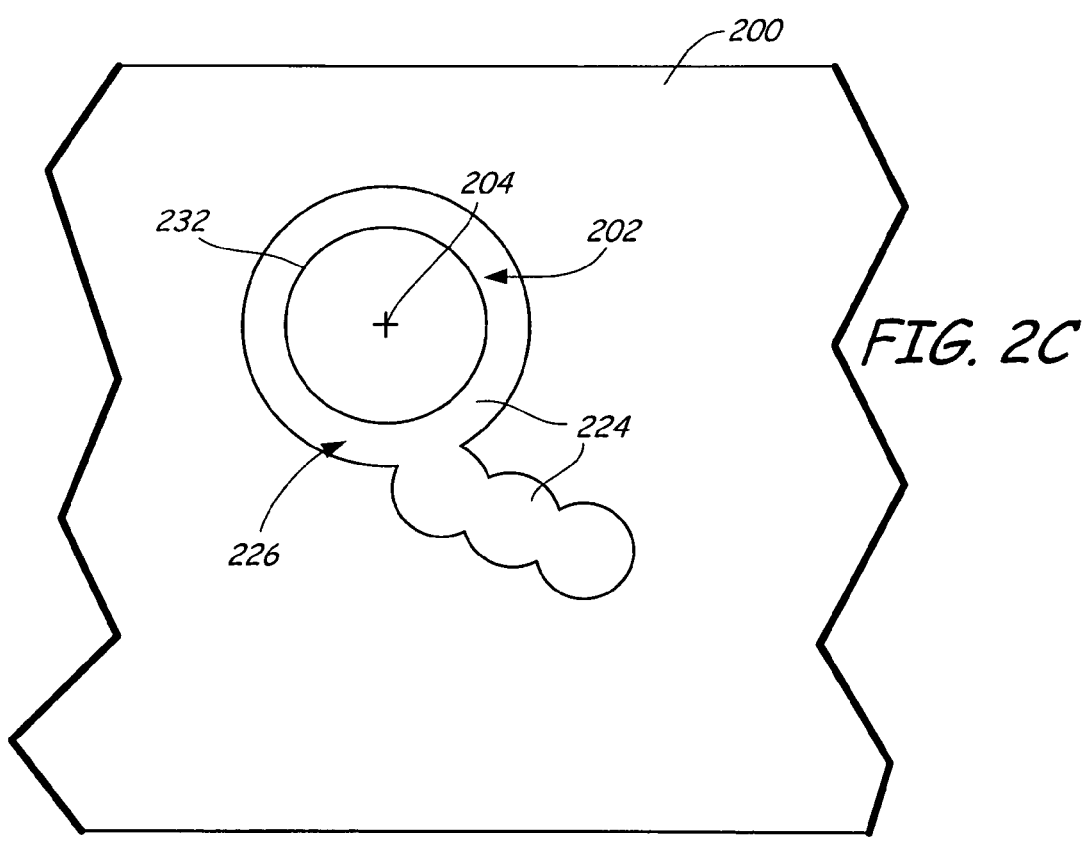
FIG. 2C is a schematic plan view of the part of FIGS. 2A-2B after finishing processes.

After filler 224 has been welded within at least portion 226 of repair pattern 210, finishing processes can be conducted as needed. For example, machining can be conducted as described above with respect to FIGS. 1A-1C in order to form a finished hole through part 200 according to desired specifications (i.e., to blueprint specifications). As shown in FIG. 2C, finished hole 232 substantially matches desired hole location 202.

In situations where only discrete damage to a part is present near a hole an insert (i.e. a weld backing) can be used during welding in order to reduce and preferably eliminate the need for post-weld finishing, such as post-weld machining. When conducting a repair procedure using an insert according to the present invention, the damage is first identified and material of the part is then removed around the location of the damage, as described above. Then, generally prior to welding the filler to the part, an insert is positioned within the hole.

Figure 3A:
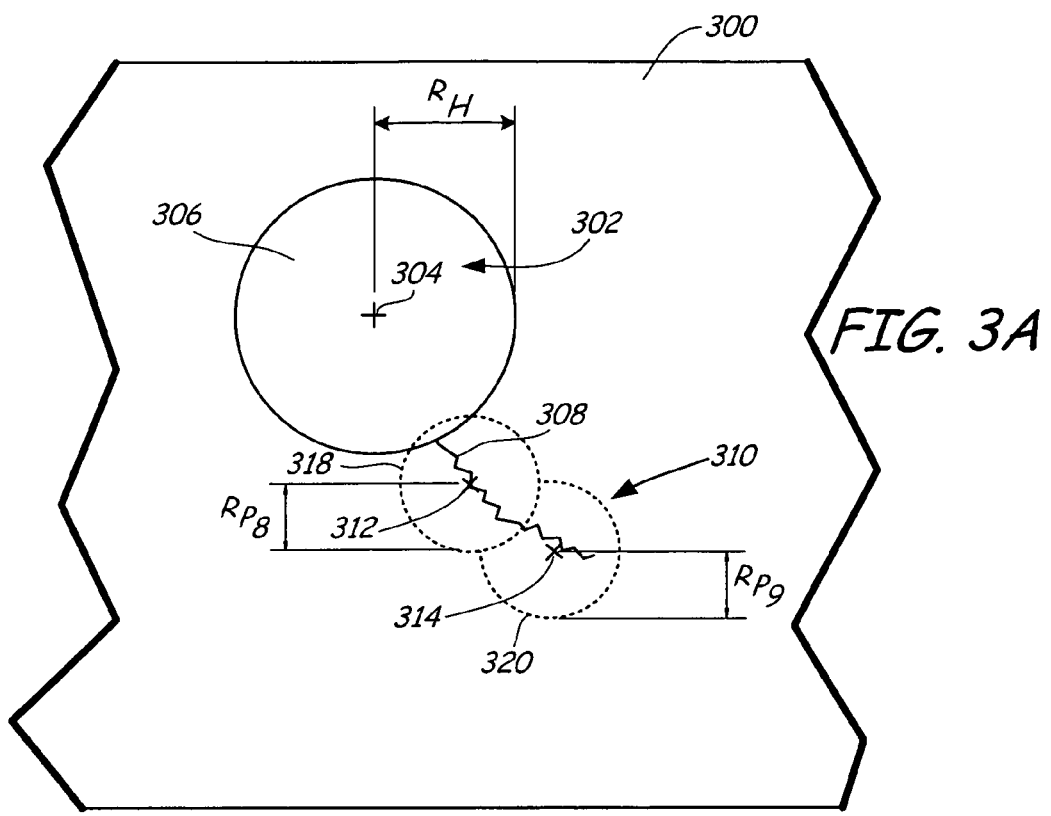
FIG. 3A is a schematic plan view of a repair pattern for a hole in a part with a crack.

FIG. 3A is a schematic representation of part 300 having hole 302 defined therethrough. Hole 302 is defined by hole centerline axis 304 and hole perimeter 306 at radius $R_H$ about axis 304. Crack 308 extends from hole perimeter 306. Chain link repair pattern 310, which is defined by first chain perimeter 318 and second chain perimeter 320, is located at hole perimeter 306. In the embodiment illustrated, pattern centerline axes 312 and 314 are noncollinear with hole centerline axis 104, although a portion of hole 306, first chain perimeter 318, and second chain perimeter 320 all overlap with the adjacent aperture. Radii $R_{P8}$ and $R_{P9}$ of first chain perimeter 18 and second chain perimeter 320 are smaller than radius $R_H$, and the cumulative value is approximately equal to $R_H$, although such a relationship is not required. In some embodiments, $R_{P8}$ is greater in diameter than $R_{P9}$, while in other embodiments $R_{P8}$ is smaller in diameter than $R_{P9}$.

Figure 3B:
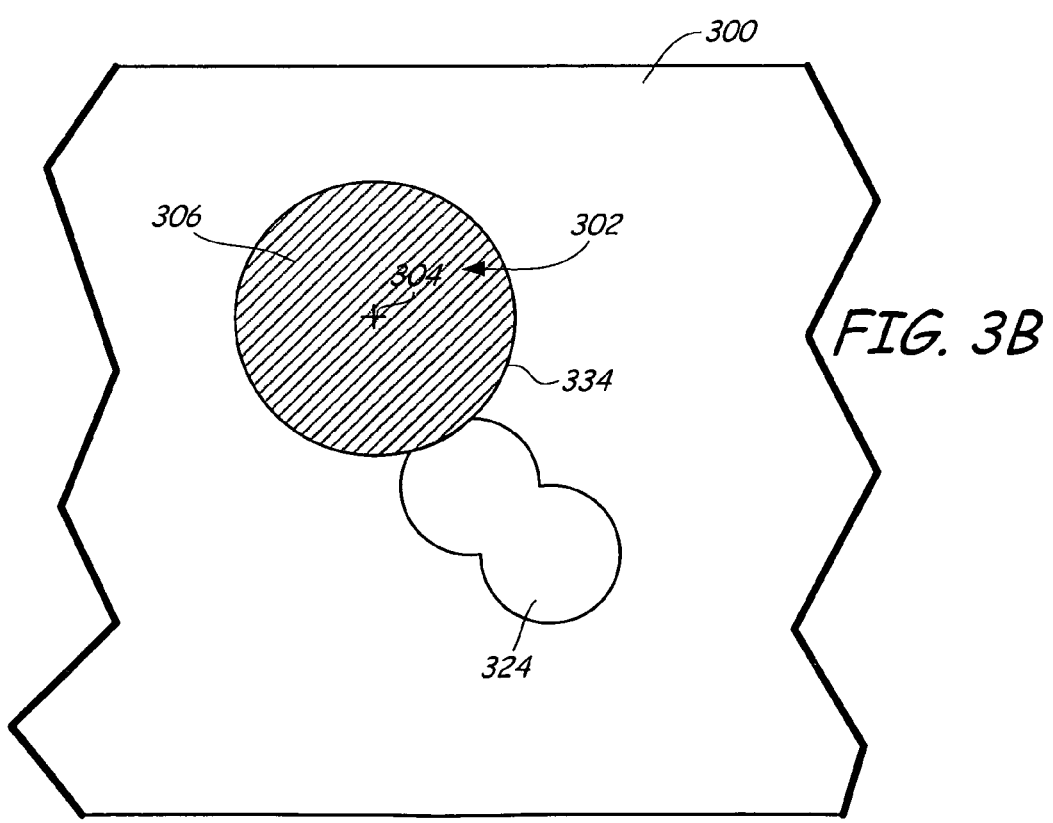
FIG. 3B is a schematic plan view of the part of FIG. 3A after a filler material has been welded to the part, and with a substantially solid insert positioned within the hole.

FIGS. 3A & 3B is a schematic representation of part 300 after base material has been removed within pattern 310. Substantially solid insert 334 is positioned within hole 302. Insert 334 is formed to the desired dimensions of desired hole shape 302. Insert 334 can be constructed of any suitable material, such as, for example, a common casting core, a refractory metal or a quartz weld backing, commonly known within the art. Insert 334 can be provided in the form of a pre-shaped solid material, or provided as a formable paste made of a powder and a suitable binder. Insert 334 should have a melting temperature greater than filler 300 and weld material 324.

Weld material 324 is welded where material was removed from pattern 310. Weld material 324 abuts part 300 and insert 334. Insert 334 acts like a casting mold during the welding process in order to form weld material 324 in a desired shape as weld material 324 becomes flowable during welding. This more closely provides desired hole specifications during the welding process, while reducing and preferably eliminating the need for post-weld finishing (e.g., machining of the weld material to desired hole specifications). Some machining may be necessary for the surfaces of the part adjacent the hole to remove excess material added by the welding process, but the hole itself will not require post-weld finishing.

In a further embodiment, the insert can be hollow. FIG. 3C is a schematic representation of hollow insert 336 positioned within hole 302 (defined by hole centerline axis 304 and hole perimeter 306) in part 300, with weld material 324 in chain link pattern 310 defined adjacent to hole 302. Hollow insert 336 is generally similar to substantially solid insert 334 shown and described with respect to FIG. 3B.

A repair made as described contains several advantages. The amount of base material removed by the process of creating a chain of holes is much less than that done by many prior art methods utilizing a single hole material removal process. This leaves a greater structural integrity of the base part over the prior art methods. The removal of material in a chain of small generally circular holes allows for the use of simple pre-existing equipment without the necessity of a large amount of new tooling. Also, the method allows for discrete removal of material along a localized crack in a small area. Thus, if further cracks develop at different locations along the hole, the repair technique may be utilized multiple times to repair these cracks, either at the same time or in the future should further defects be later detected in the part. The removal method as disclosed allows for repair of multiple longer cracks eminating from random locations adjacent a hole than provided in prior art techniques. Creating a chain of smaller material removals versus a single hole removal minimizes melting of the base material, thus assuring structural integrity of the part.

Although the present invention has been described with reference to preferred embodiments, workers skilled in the art will recognize that changes may be made in form and detail without departing from the spirit and scope of the invention.

The invention claimed is:

1. A method of repairing a defect adjacent a desired hole, the method comprising:
   removing at least one defect adjacent the desired hole in a base material by removing a first portion of the base material proximate to the desired hole;
   removing a second portion of the base material proximate to the first portion, wherein the first and second portions create a chain of overlapping apertures adjacent to the desired hole; and welding a filler material to the base material after removing the first and second portions of the base material.

2. The method of claim 1, wherein the step of welding a filler material to the base material comprises utilization of conductive heat resistance welding.

3. The method of claim 1, and further comprising removing a portion of the filler material until the desired hole shape has been obtained.

4. The method of claim 1, wherein the first portion is removed prior to removing the second portion of the base material.

5. The method of claim 1, wherein removing the first portion of the base material is done by drilling a first aperture in the base material.

6. The method of claim 1, and further comprising:
positioning an insert relative to the desired hole in the base material prior to welding the filler material, wherein the insert substantially defines the desired hole for welding the filler material at a perimeter portion of the desired hole.

7. The method of claim 6, wherein the desired hole is defined by the insert in the base material after welding the filler material, without requiring post-welding machining of the hole itself.

8. The method of claim 6, and further comprising:
removing the insert.

9. The method of claim 1, wherein removing the first portion of the base material is done after removal of the second portion of the base material.

10. The method of claim 1, wherein removing the first portion and the second portion of the base material are done by drilling adjacent apertures that remove the defect adjacent the desired hole.

11. A method of repair in a part, the method comprising:
creating a substantially circular first opening in the part that is larger in diameter than a desired hole, wherein centerline axes of the desired hole and the first opening are aligned;
creating a second opening in the part, wherein the second opening is positioned proximate a perimeter of the first opening;
creating a third opening in the part adjacent the second opening, wherein the first opening, the second opening, and the third opening are contiguous; and
welding a filler material within at least portions of the first, second, and third openings.

12. The method of claim 11, wherein the step of welding a filler material to the base material comprises utilization of conductive heat resistance welding.

13. The method of claim 11, wherein the first opening is created before the second and third openings.

14. The method of claim 11, wherein the second opening is substantially circular and has a centerline axis, and wherein the centerline axis of the second opening is spaced from the centerline axis of the first opening.

15. The method of claim 11, and further comprising removing a portion of the filler material until the desired hole has been obtained.

* * * * *